United States Patent
Deylitz et al.

(10) Patent No.: US 6,838,626 B2
(45) Date of Patent: Jan. 4, 2005

(54) ELECTRIC SWITCH WITH A DRIVE SHAFT AND A BLOCKING MECHANISM FOR BLOCKING ACTUATION OF THE DRIVE SHAFT

(75) Inventors: Erhard Deylitz, Berlin (DE); Stefan Losch, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/475,607

(22) PCT Filed: Mar. 26, 2002

(86) PCT No.: PCT/DE02/01158
§ 371 (c)(1),
(2), (4) Date: Oct. 22, 2003

(87) PCT Pub. No.: WO02/087040
PCT Pub. Date: Oct. 31, 2002

(65) Prior Publication Data
US 2004/0112722 A1 Jun. 17, 2004

(30) Foreign Application Priority Data
Apr. 23, 2001 (DE) .......................................... 101 20 784
Feb. 21, 2002 (DE) ...................................... 202 02 929 U

(51) Int. Cl.[7] ................................................ H01H 9/00
(52) U.S. Cl. ................................ 200/50.21; 200/50.24
(58) Field of Search .......................... 200/50.17, 50.21, 200/50.23–50.27; 361/605–610, 615

(56) References Cited

U.S. PATENT DOCUMENTS

| | | | |
|---|---|---|---|
| 3,213,224 A | * 10/1965 | Mrenna et al. | 200/50.15 |
| 4,139,748 A | 2/1979 | Wolfe et al. | |
| 4,262,175 A | * 4/1981 | Rexroad et al. | 200/50.21 |
| 5,278,722 A | * 1/1994 | Peruso | 361/606 |
| 5,337,210 A | * 8/1994 | Ishikawa et al. | 361/608 |
| 5,466,902 A | * 11/1995 | Blom et al. | 200/50.21 |
| 5,912,444 A | * 6/1999 | Godesa | 200/50.01 |
| 6,005,208 A | * 12/1999 | Castonguay | 200/308 |
| 6,066,814 A | * 5/2000 | Smith et al. | 200/50.24 |

FOREIGN PATENT DOCUMENTS

| | | |
|---|---|---|
| DE | 44 20 580 C1 | 11/1995 |
| DE | 44 20 581 C1 | 11/1995 |

* cited by examiner

*Primary Examiner*—Michael A. Friedhofer
(74) *Attorney, Agent, or Firm*—Harness, Dickey & Pierce, P.L.C.

(57) ABSTRACT

An electric switch includes a drive shaft that can be actuated by means of a hand crank and a blocking mechanism for blocking actuation of the drive shaft. The hand crank has a shaft that can be displaced along the drive shaft and that is protected against removal by the drive shaft and a crank arm that is axially fixed on the shaft and is wound by the shaft. In order to configure that blocking mechanism in such a way that a blocking force substantially smaller in comparison with the torque of the drive shaft is needed in order to block actuation of the drive shaft, a recess is provided on the front side of the switch, into which the crank arm can be lowered in an anti-rotational manner by displacing the shaft, wherein the blocking mechanism that has been activated for blocking fixes the shaft axially once the crank arm has been lowered into the recess.

14 Claims, 3 Drawing Sheets

ELECTRIC SWITCH WITH A DRIVE SHAFT AND A BLOCKING MECHANISM FOR BLOCKING ACTUATION OF THE DRIVE SHAFT

This application is the national phase under 35 U.S.C. §371 of PCT International Application No. PCT/DE02/01158 which has an International filing date of Mar. 26, 2002, which designated the United States of America and which claims priority on German Patent Application numbers DE 101 20 784.0 filed Apr. 23, 2001 and DE 202 02 929.8 filed Feb. 21, 2002, the entire contents of which are hereby incorporated herein by reference.

FIELD OF THE INVENTION

The invention generally relates to an electric switch with a drive shaft. Preferably, it relates to one which can be actuated by a crank handle, and which includes a blocking mechanism for blocking the actuation of the drive shaft. The crank handle preferably includes a shaft which is displaceable along the drive shaft, is preferably secured in a manner that prevents it from being removed from the drive shaft and preferably includes a crank arm fixed axially on the shaft and angled away from the shaft.

BACKGROUND OF THE INVENTION

An electric switch is known for example from U.S. Pat. No. 4,139,748. In the case of this known switch, the drive shaft is part of a traveling mechanism of the electric switch for making the switch travel in relation to a withdrawable rack.

In this respect, the drive shaft has a flange provided with three slits. Depending on whether the switch is in the isolating position (main isolating contacts and auxiliary isolating contacts of the switch are open), test position (main isolating contacts are open, auxiliary isolating contacts are closed) or operating position (main isolating contacts and auxiliary isolating contacts are closed) in the withdrawable rack, a blocking pawl engages in one of the three slits under the force of a biasing spring and consequently prevents the drive shaft from being turned by use of the crank handle.

The blocking pawl and the flange must in this case produce a blocking action which corresponds to the high torque transmitted from the crank handle to the drive shaft. They therefore have to meet high requirements with respect to their dimensioning and strength. In order to make the switch travel, i.e. to actuate the drive shaft, the blocking pawl must be disengaged from the respective slit against the force of the biasing spring by way of an actuator which is coupled to the blocking pawl by means of a slot-pin connection. The actuator in this case passes through an opening on the front side of the switch.

SUMMARY OF THE INVENTION

It is an object of an embodiment of the invention to configure the blocking mechanism in such a way that a blocking action that is substantially smaller in comparison with the torque of the drive shaft is required to block actuation of the drive shaft.

According to an embodiment of the invention, an object is achieved by providing, on the front side of the switch, a recess into which the crank arm of the crank handle can be lowered in an anti-rotational manner by displacing the shaft, wherein the blocking mechanism that has been activated for blocking fixes the shaft of the crank handle axially once the crank arm has be lowered in the recess.

This arrangement has the effect of preventing the crank handle from being pulled out of the recess, and consequently the drive shaft from being actuated by way of the crank handle. The counter force to be applied in this case by the blocking mechanism is very small, since it corresponds in its value to the force which is manually applied by the operator attempting to pull the shaft out of the recess. It is, in particular, substantially smaller than the force effect of the torque which can be transmitted to the drive shaft when the crank handle is pulled out. This small counter force to be applied does not impose any high requirements on the dimensioning or strength of the blocking mechanism and makes it possible for less expensive materials also to be used for its production.

In a development of an embodiment of the invention, it is provided that the blocking mechanism can be activated for blocking the drive shaft when the crank arm has been pulled out of the recess. This configuration of the blocking mechanism allows the blocking mechanism to be activated already when, for example, the switch is made to travel out of its fixed position into its isolating position, so that the crank arm is then able to be lowered in the recess when the intended position is reached, for example the isolating position, but cannot be pulled out of the recess again after it has be lowered.

An embodiment that serves for this purpose and is given a structurally very simple form provides that the blocking mechanism has a slot which is arranged in the shaft of the crank handle and is limited axially (i.e. in the direction of the axis of the shaft), a blocking element which serves for engagement in the slot and an actuating element which acts on the blocking element, and that the blocking mechanism is activated when the actuating element has been transferred into an ON position, the blocking element being coupled to the actuating element by way of a spring mechanism and sliding on the shaft until engagement in the slot when there is axial movement of the shaft.

In a development of this embodiment, it is provided that the blocking element has a sliding surface, by which the blocking element is pressed out of the path of movement of the shaft when the crank arm is displaced in the direction of the recess. In the case of this embodiment, the crank handle can be pulled out of the recess substantially over the entire length of its shaft irrespective of the position of the blocking element. As a result, adequate free space is available for the operating personnel to turn the crank arm unhindered.

For the alternative actuation of the blocking element, the one actuating element may be coupled to an additional actuating element. It is consequently ensured that the blocking mechanism can be activated at least by use of two devices which respectively act on one of the two actuating elements and can also act independently of each other.

BRIEF DESCRIPTION OF THE DRAWINGS

An electric switch is formed according to an embodiment of the invention in the form of a low-voltage circuit-breaker as represented in FIGS. 1 to 6, and will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
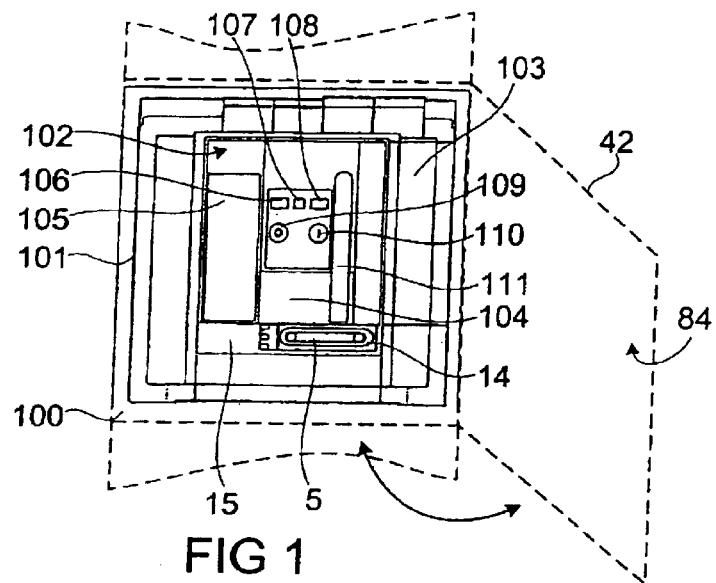
FIG. 1 shows a front view of a switching point with a withdrawable rack, in which a low-voltage circuit-breaker which has a recess for a crank handle of a traveling mechanism is arranged.

According to FIG. 1, a withdrawable rack 101 is arranged in a switchgear cell 100 of a switchgear cabinet or a switching station, a low-voltage circuit-breaker 102 being arranged such that it can be made to travel in a known way in the withdrawable rack 101.

The low-voltage circuit-breaker 102 retracted in the withdrawable rack 101 (cf. also FIG. 6) has a housing 103 (cf. also FIG. 6) for receiving a switching pole assembly and an operator console 104, which is fastened on the front side of the housing 103, forms the front side of the switch and by means of which a switching drive and further parts of the switch are covered. Arranged on the operator console 104 are an overcurrent trip 105, operating and indicating elements 106 to 110, a hand-wound lever 111 for tensioning a spring energy store of the switching drive and also a crank handle 5, which can be lowered into a recess 14, for actuating a drive shaft 3 (cf. FIGS. 3 and 4) of a traveling mechanism 1 (cf. FIGS. 2 to 5).

Figure 2:
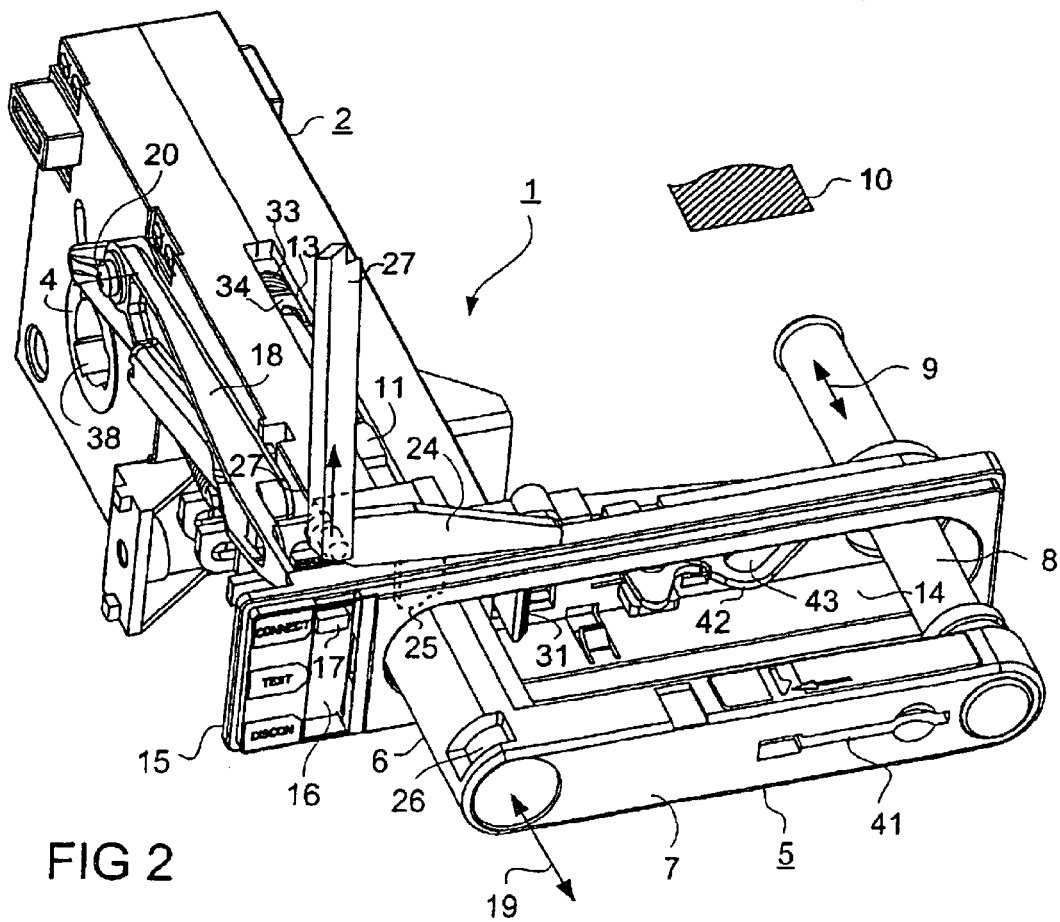
FIG. 2 shows the traveling mechanism of the low-voltage circuit-breaker according to FIG. 1 as an assembly.
Figure 3:
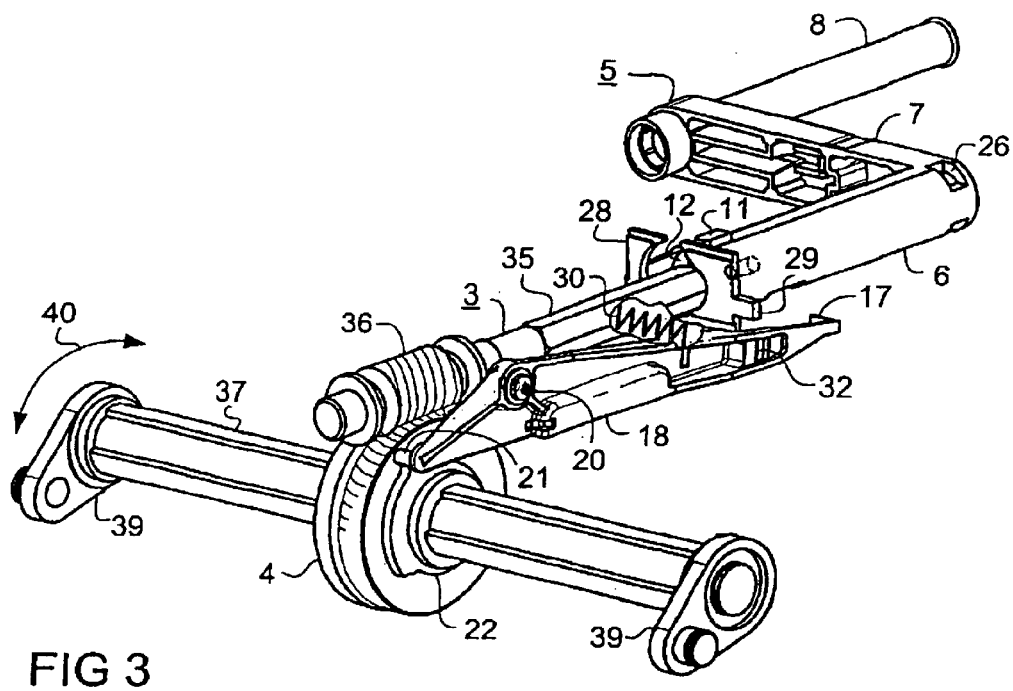
FIG. 3 shows the traveling mechanism according to FIG. 2, but without a housing and without the recess for the crank handle, a traveling shaft of the traveling mechanism being located in the isolating position of the associated circuit-breaker.
Figure 4:
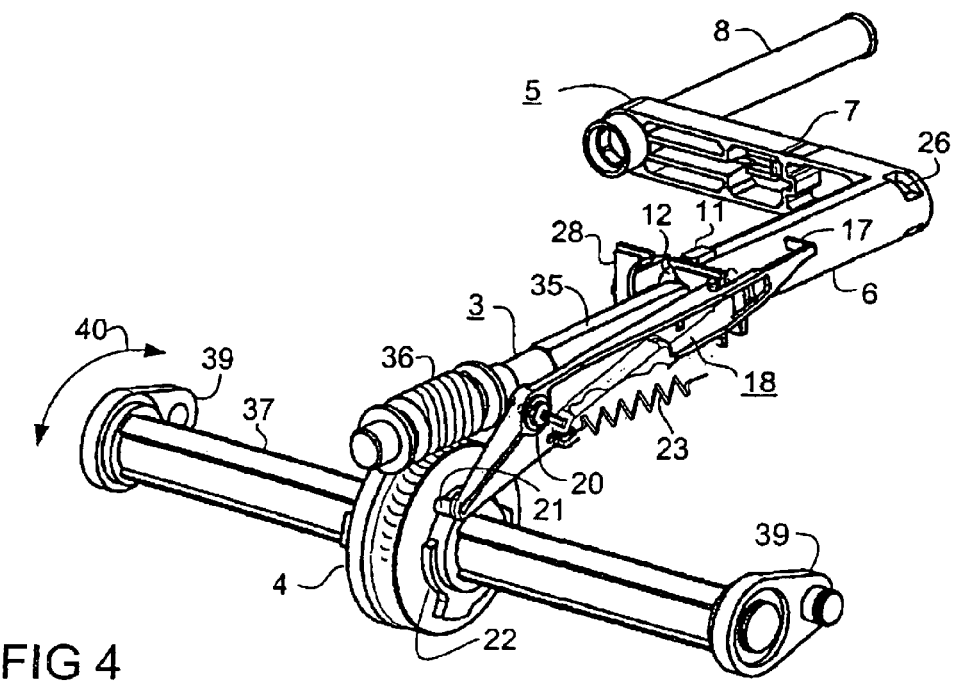
FIG. 4 shows a representation corresponding to FIG. 3 of essential parts of the traveling mechanism, but in the operating position of the associated circuit-breaker

According to FIG. 2, the traveling mechanism 1 has a housing 2, which may expediently be made up of two shell-like halves, between which parts of the gear mechanism and further components are arranged. A turning movement exerted by use of the crank handle 5 is transformed by way of the drive shaft 3 (cf. FIGS. 3 to 4) into a rotation of a traveling shaft 37 (FIGS. 3 and 4). Arranged for this purpose on the drive shaft 3 is a worm 36 (cf. FIGS. 3 and 4), which is in engagement with a gear wheel 4. The longitudinal axes of the drive shaft 3 and of the traveling shaft 37 are at right angles to each other. The traveling shaft 37 is not fixedly connected to the traveling mechanism 1, but is displaceable in a profiled opening 38 of the gear wheel 4, which is adapted to the profile of the traveling shaft 37. In this way, the traveling mechanism 1 can be used for circuit-breakers of different sizes and is not restricted to a specific position along the traveling shaft 37.

Attached to the ends of the traveling shaft 37 in a known way are traveling cranks 39 (cf. FIGS. 3 and 4), which interact with fixed parts approximately in the way schematically shown for example in DE 44 20 580 C1 or DE 44 20 581 C1 (FIG. 1 in each case). Likewise not represented is the fastening of the traveling mechanism 1 on a circuit-breaker, since a person skilled in the art is familiar with this.

Serving for turning the drive shaft 3 mounted in the housing 2, as already mentioned, is a crank handle 5, which, as a difference from other known traveling mechanisms (cf. the cited DE 44 20 580 C1 and DE 44 20 581 C1), cannot be removed from the drive shaft 3 but is a component part of the traveling mechanism 1. The crank handle 5 has a hollow shaft 6, which reaches around a hexagonal shaft 35 of the drive shaft 3 (FIGS. 3 and 4) and is displaceable on the drive shaft 1 along the direction of an arrow 19. Obviously, the drive shaft 3 and the shaft 6 may also have different profiles in order to establish a rotationally locked coupling which permits a longitudinal displacement.

The shaft 6 bears a guiding pin 11, which engages in a guiding slot 13 provided on the housing 2. Since the guiding slot 13 is adapted to the guiding pin 11, the shaft 6 can be displaced along the guiding slot 13, but without the possibility of rotation. This is only made possible when the shaft 6 has been pulled out fully forward, where, in the housing 2, the guiding slot 13 opens into an annular slot. In this connection, "annular slot" is also to be understood as meaning differently shaped recesses of the housing 2 that permit free rotation of the shaft 6.

The crank handle 5 includes not only the shaft 6 but also a crank arm 7 which is connected to the shaft 6 (or is produced in one piece with it) and on the end of which there is an opening for accommodating a grip 8. The grip 8 is displaceable in the the opening parallel to the shaft 6 in the direction of an arrow 9 and can be transferred by the user out of the pushed-in inoperative position according to FIG. 2 into a pulled-out working position, which is shown in the FIGS. 3 and 4.

In the normal or inoperative position (cf. FIGS. 1 and 6), the crank handle 5 can be accommodated in a manner in which it is lowered flush in a recess formed as an accommodating recess 14. The accommodating recess 14 belongs to an operator console insert 15 (cf. FIGS. 1 and 2), which is arranged on the lower edge of the operator console 104 of the circuit-breaker 102. When the crank handle 5 is pushed into its inoperative position, an end face 12 (cf. FIGS. 3 to 5) at the end of the shaft 6 comes to bear against a supporting ring 34, which is loaded by a stop spring 33 (cf. FIG. 5). The stop spring 33 is a helical compression spring which is seated on the drive shaft 3.

Subsequently, the user pushes the grip 8 through the opening located in the crank arm 7 into the position in which it is flush with the crank arm 7. The inner end of the grip 8 then bears against a stop 10.

In this pushed-in inoperative position, the user has in fact no possible way of grasping the crank arm, because the contour of the accommodating recess 14 is adapted to the crank arm 7 with the shaft 6 and grip 8. Nevertheless, rapid access is ensured when needed. This takes place by virtue of the depth of the accommodating recess being dimensioned such that it is larger by a certain amount than is required for accommodating the parts mentioned.

The user can therefore press the crank arm 7 somewhat into the accommodating recess against the force of the stop spring 33. The grip 8 cannot participate in this movement, however, because it is bearing against the fixed stop 10, and is then protruding by the same amount out of the crank arm 7. The user can then pull out the grip 8 and subsequently the crank arm 7 with the shaft 6.

In a way similar to in the case of known traveling mechanisms, arranged next to the crank handle 5 is an indicating window 16, in which an indicating device 17, for the operational position of the circuit-breaker in its withdrawable rack, is visible. As is known, these positions, e.g. operating position, test position and isolating position, relate to the relative position of movable main isolating contacts and auxiliary isolating contacts and consequently, with a given arrangement of these isolating contacts, to the position of the circuit-breaker 102 in the associated withdrawable rack 101. On account of the engagement of the traveling cranks 39 at the ends of the traveling shaft 37 in a fixed guide of the withdrawable rack 101, the angular position of the gear wheel 4 consequently constitutes a reliable feature for the positions.

According to FIGS. 3 and 4, for the purposes of the indicating device, arranged on an end face of the gear wheel 4 is a control cam 22, against which a sensing pin 21 of a two-armed indicating lever 18 bears under the action of a tension spring 23 (FIG. 4). The indicating lever 18, pivotable about a bearing screw 20, consequently transfers the control cam 22 into a position of the indicating device 17 which can be perceived by the user in the indicating window 16 (cf. FIG. 2). In this respect it is essential that, when actuating the crank handle 5, the user can easily recognize when the positions mentioned are reached. For this purpose, the control cam 22 is provided with portions of different slopes, which are shaped in such a way that, shortly after leaving one of the positions mentioned, the indicating device in each case assumes an intermediate position and then only shortly before the following position is reached points to it. As a result of the bearing screw 20 of the indicating lever 18 being placed relatively close to the control cam 22, relatively small deflections are transformed into easily visible movements of the indicating device 17 in the indicating window 16.

The shaft 6 is protected against being pushed unintentionally into the housing 2 by a locking slide 28, which is loaded by a biasing spring 30 (FIG. 3). The locking slide 28 is guided in the front part of the housing 2 and at the same time interacts with the end face 12 at the inner end of the shaft 6. When the shaft 6 is pulled out into its working position, the locking slide 28 springs with one of its two edges facing the drive shaft 3 behind the end face 12 and consequently blocks the pushing-in of the shaft 6. In order to release the shaft 6 for pushing in, available to the user is an actuating lug 31 (cf. FIG. 2), which is arranged in such a way that it protrudes into the accommodating recess 14 and is therefore accessible only when the crank handle 5 is pulled out.

The locking slide 28 has an additional function in the central position (test position) of the traveling mechanism 1. As a difference from the operating position and isolating position, this position is not conveyed to the user by a resistance that can be felt at the crank handle when end stops are reached. In order that the user can nevertheless only push the crank handle 5 in when the test position has been precisely reached, the locking slide 28 is provided with a tongue 29, which emerges from the side of the housing 2 when the actuating lug 31 is operated and a window opening arranged in the indicating lever 18 is opposite the tongue 29.

The traveling mechanisms of the known switches already have a device which prevents actuation when the circuit-breaker is switched on (DE 44 20 580 C1). For this purpose, access to the drive shaft is blocked by a protective element. In the case of the traveling mechanism according to an embodiment of the invention, the user is additionally also barred access to the crank handle 5, in that, when the crank arm 7 is lowered in the recess 14, a first blocking mechanism, activated for blocking the actuation of the drive shaft, axially fixes the shaft 6 of the crank handle 5. This takes place by a first blocking element, formed as a blocking lever 24 (cf. FIGS. 2 and 6) in combination with a blocking slot 26 arranged in the shaft 6 of the crank handle and limited in the axial direction of the switch (FIG. 2).

The blocking lever 24 is in this case appropriately in connection with a first actuating element formed as a blocking rod 27 (FIG. 2), as is described in DE 44 20 580 C1. If the preconditions that allow the traveling mechanism 1 to be safely actuated are satisfied, the blocking lever 24 is raised by the actuating element 27 in a manner corresponding to an arrow shown in FIG. 1, a blocking lug 25 of the blocking lever 24 being pulled out of the blocking slot 26 of the shaft 6. Conversely, the switching-on of the circuit-breaker 102 is only possible when the crank handle 5 has been pushed back into its inoperative position in the recess 14, and consequently the blocking lug 25 on the blocking lever 24 can again enter the blocking slot 26.

Figure 5:
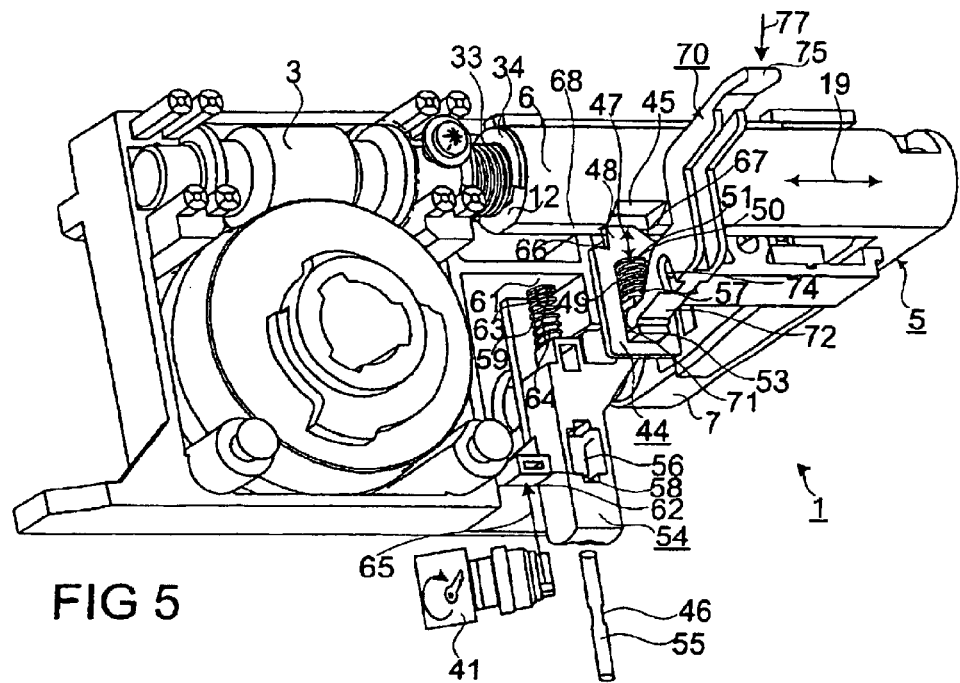
FIGS. 5 and 6 show two further representations of the traveling mechanism with a blocking mechanism and with a device for controlling the blocking mechanism.

According to FIG. 5, the traveling mechanism 1 of the novel switch has a second blocking mechanism for blocking the actuation of the drive shaft 3. This second blocking mechanism serves the purpose of preventing the switch from traveling in the withdrawable rack by way of a cylinder lock 41 (FIG. 5); 42 (FIG. 6) and/or when the door 42 of the switchgear cell 100 is open (cf. FIG. 1).

This second blocking mechanism also fixes the shaft 6 of the crank handle 5 in its axial direction 19 when the blocking mechanism is activated for blocking and when the crank arm 7 of the crank handle is lowered in the recess 14. This takes place by a second blocking element, which is formed as a blocking pawl 44, in combination with a second blocking slot 45, which is arranged in the shaft 6 of the crank handle and is likewise limited in the axial direction 19 of the shaft 6. The blocking pawl 44 is formed as a punched metal part and is guided, in a manner that permits it to be displaced perpendicularly in relation to the shaft 6, on stop surfaces of the traveling mechanism in the direction of the arrow 47. It has not only a blocking lug 48, which is formed on the side facing the shaft 6, but also a window-like opening 49, from the one inside wall of which there is formed a first holding stud 50, running parallel to the direction of displacement 47 of the blocking pawl, for a biasing spring 51.

Protruding into the window-like opening 59 of the blocking pawl 44 is a first arm 53 of a second actuating element 54, which is held on the traveling mechanism in a manner that permits it to be displaced in the direction of displacement 47 of the blocking pawl. Serving to secure this second actuating element 54 on the traveling mechanism 1 is a cylindrical pin 55, which passes through inside walls, running perpendicularly in relation to the direction of displacement 47, of the actuating element 54 and fastening straps, lying opposite these walls, of the traveling mechanism in the region of corresponding through-bores.

For the axial fixing of the pushed-in pin, the pin has a tapered portion 46, into which a resilient lug 56 of the fastening element 54 snaps. For removing the actuating element 54, this lug 56 can be bent out from the tapered portion 46 of the pin 55 by means of a screwdriver or a comparable narrow implement and consequently the pin can be released for pulling out.

Formed on the first arm 53 of the second actuating element 54 is a second holding stud 57 for the biasing spring 51. A second arm 58 of the actuating element 54 bears under the force of a restoring spring 59, which is supported on a first supporting surface 61 of one of the housing halves of the traveling mechanism, against a second supporting surface 62 of this housing half. For guiding the retaining spring 59, the one supporting surface 61 and the actuating element 54 are respectively provided with a holding stud 63, 64. Serving for controlling the actuating element 54 is a first schematically represented cylinder lock 41.

When this first cylinder lock 41 closes, a lug (not represented) acts in the direction of the arrow 65 on the second arm 58 and displaces the actuating element 54 and the blocking pawl 44, coupled to the actuating element 54 via the biasing spring 51, against the force of the restoring spring 56 out of an OFF position (cf. FIG. 5) into an ON position in the direction of the shaft 6 of the crank handle.

With the shaft 6 pushed in completely, i.e. with its crank arm 7 lowered in its recess, the second blocking slot 45 of the shaft 6 is opposite the blocking lug 48 of the blocking pawl 44, so that the latter can enter the blocking slot 45.

When it is attempted to pull the crank arm 7 out of the recess 14, the one side surface of the blocking slot 45 comes into bearing contact with a stop surface 66 of the blocking lug 48 and consequently signals to the operator that blocking of the traveling mechanism is in effect. In this case, even a slight resistance is sufficient to signal the blocking of the traveling mechanism. As a difference from the first actuating element 27 of the first blocking mechanism, the second actuating element 54 is displaceable out of its OFF position into its ON position even when the crank arm 7 is not, or not yet completely, lowered in the recess 14.

With the shaft 6 completely pulled out, when the actuating element 54 is raised, the blocking pawl is likewise raised and consequently protrudes into the path of movement of the shaft 6. When the shaft is pushed in, the end face 12 of the shaft 6 slides over a sliding surface 67 of the blocking lug 48 of the blocking pawl and presses the blocking pawl 44 out of the path of movement of the shaft against the force of the biasing spring 51. After that, the blocking pawl 48 slides along on a flattened generated surface 68 of the shaft until it snaps into the blocking slot 45.

For the alternative actuation of the blocking pawl 44, the second actuating element is coupled to a third actuating element formed as a two-armed lever 70. For the coupling, the second actuating element 54 has at the free end of its first arm 53 a U-shaped recess 71, in which a first arm 72 of the two-armed lever 70 engages. This two-armed lever is pivotable about a fixed bearing screw (not represented), which passes through a bore 74 of the lever 70. The second lever arm 75 of lever 70 can be actuated by means of a pawl 73 of the cylinder lock 42 (cf. FIG. 6) in the direction of the arrow 77.

Figure 6:
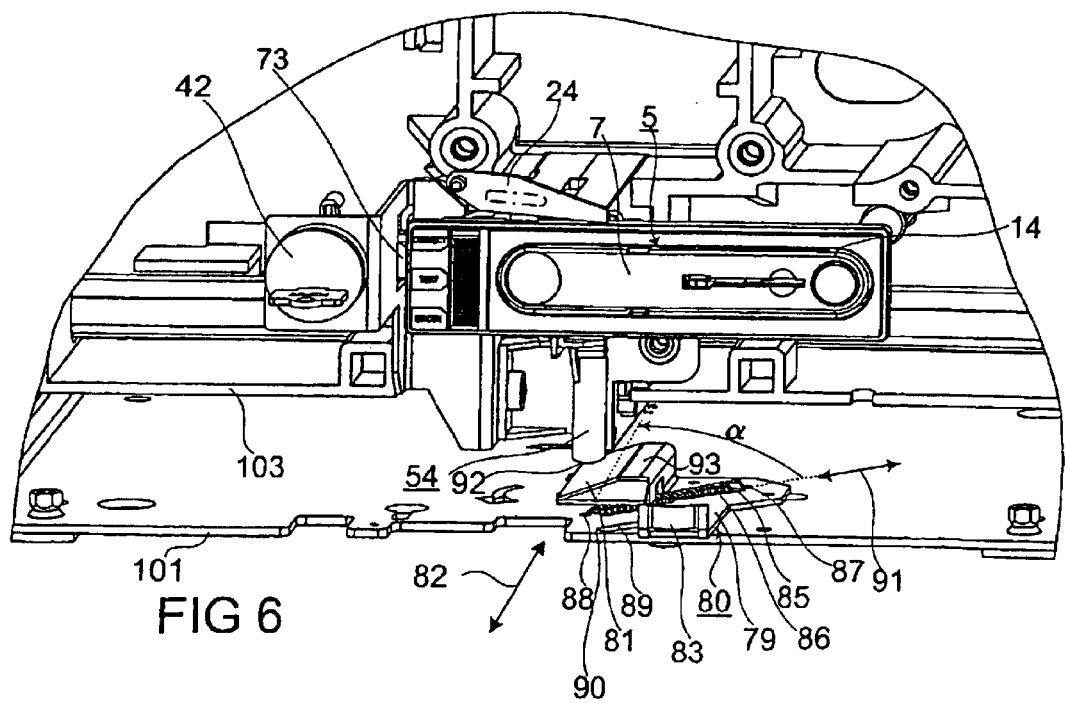

According to FIG. 6, a device which has a pushing element 80 provided with an oblique surface serves for controlling the movement of the actuating element 54 and consequently for controlling the second blocking mechanism. This pushing element 80 is formed as a punched/bent metal part and has in addition to the oblique surface 81, which is inclined at right angles to the direction of the traveling path of the switch, an angled-away supporting arm 79 for bearing against the inner side 84 of the door 42 of the switchgear cell 100 (cf. FIG. 1) and a window-like opening 85 for accommodating a restoring spring 86 and a bore 87, forming the abutment for one end of the restoring spring.

The angled-away end 83 of the supporting arm is curved in such a way that it bears with point contact, and consequently low friction, against the inner side of the door. The window-like opening 85 extends in the operative direction 91 of the restoring spring and consequently approximately at an angle α of 45 degrees obliquely in relation to the traveling direction 82 of the switch. The angle a between the traveling direction of the switch and the operative direction of the restoring spring should preferably be between 30 and 60 degrees.

The abutment of the other end of the restoring spring 86 is formed by a bore 88 in the withdrawable rack of the switch. Also formed in the withdrawable rack, parallel to the operative direction 91 of the restoring spring 86, are three guiding slits, only one 89 of which can be seen in FIG. 6. These form a three-point bearing for the supporting element. They are respectively passed through by a guiding pin riveted on the pushing element, the free ends of the guiding pins being provided with a collar of a diameter which is wider than the width of the guiding slits. One end of the guiding slits is in each case widened in such a way that the pins can easily be introduced with their collar into the slits.

The other end of the slits in each case forms a stop 90, on which the pushing element is held under the force of the restoring spring when the door is open. In this stop position of the pushing element, a working surface 93 adjoining the upper end of the oblique surface is opposite a rounded-off free end 92 of the second actuating element 54, whereby the second actuating element 54 is activated in its ON position and consequently the second blocking mechanism is activated in its blocking position.

When the door is closed, the inner side 84 of the door 42 comes into bearing contact with the angled-away end 83 of the supporting arm 79 of the pushing element and displaces the pushing element 80 against the force of the restoring spring 86 obliquely in relation to the traveling direction 82 of the switch in such a way that the oblique surface 81 of the pushing element slides away laterally at the free end of the second actuating element until the lower end of the oblique surface is opposite the free end (cf. FIG. 6). As a result, the second actuating element is released and assumes its OFF position under the force of the restoring spring 59, whereby the second blocking mechanism is transferred into its release position.

As an alternative to this embodiment of the device, the oblique surface may also be formed on the withdrawable rack of the switch, the pushing element then acting on the second actuating element by sliding on the oblique surface.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electric switch, comprising:
   a drive shaft, adapted to be actuated by a crank handle;
   a blocking mechanism for blocking the actuation of the drive shaft, the crank handle including,
   a shaft which is displaceable along the drive shaft, wherein the crank handle is secured in a manner that prevents it from being removed from the drive shaft, and
   a crank arm fixed axially on the shaft and angled away from the shaft; and
   a recess, provided on the front side of the switch, into which the crank arm is adapted to be lowered in an anti-rotational manner by displacing the shaft, wherein the blocking mechanism, that has been activated for blocking, fixes the shaft axially once the crank arm has been lowered into the recess.

2. The electric switch as claimed in claim 1, wherein the blocking mechanism is adapted to be activated for blocking the drive shaft when the crank arm has been pulled out of the recess.

3. The electric switch as claimed in claim 2, wherein the blocking mechanism includes,
   a slot arranged in the shaft of the crank handle and limited axially,
   a blocking element which serves for engagement in the slot, and
   an actuating element which acts on the blocking element, and wherein
the blocking mechanism is activated when the actuating element has been transferred into an ON position, the blocking element being coupled to the actuating element via a spring mechanism and sliding on the shaft until engagement in the slot when there is axial movement of the shaft.

4. The electric switch as claimed in claim 3, wherein the blocking element includes a sliding surface, by which the blocking element is pressed out of the path of movement of the shaft when the crank arm is displaced in the direction of the recess.

5. The electric switch as claimed in claim 3, wherein, for the alternative actuation of the blocking element, the one actuating element is coupled to an additional actuating element.

6. The electric switch as claimed in claim 4, wherein, for the alternative actuation of the blocking element, the one actuating element is coupled to an additional actuating element.

7. An electric switch, comprising:
a blocking mechanism, adapted to block actuation of a drive shaft;
a crank handle, adapted to actuate the drive shaft, secured to the drive shaft, and including,
a shaft, displaceable along the drive shaft, and
a crank arm, fixed on the shaft; and
a recess, adapted to receive the crank arm when lowered in an anti-rotational manner by displacing the shaft, wherein upon the blocking mechanism being activated for blocking, it fixes the shaft axially upon the crank arm being lowered into the recess.

8. The electric switch as claimed in claim 7, wherein the blocking mechanism is adapted to be activated for blocking the drive shaft when the crank arm has been pulled out of the recess.

9. The electric switch as claimed in claim 8, wherein the blocking mechanism includes,
a slot arranged in the shaft of the crank handle and limited axially,
a blocking element which serves for engagement in the slot, and
an actuating element which acts on the blocking element, wherein the blocking mechanism is activated when the actuating element has been transferred into an ON position, the blocking element being coupled to the actuating element via a spring mechanism and sliding on the shaft until engagement in the slot when there is axial movement of the shaft.

10. The electric switch as claimed in claim 9, wherein the blocking element includes a sliding surface, by which the blocking element is pressed out of the path of movement of the shaft when the crank arm is displaced in the direction of the recess.

11. The electric switch as claimed in claim 10, wherein, for the alternative actuation of the blocking element, the one actuating element is coupled to an additional actuating element.

12. The electric switch as claimed in claim 9, wherein, for the alternative actuation of the blocking element, the one actuating element is coupled to an additional actuating element.

13. An electric switch, comprising:
first means for blocking actuation of a drive shaft;
second means for actuating the drive shaft, the second means being secured to the drive shaft, and including,
a shaft, displaceable along the drive shaft, and
a crank arm, fixed on the shaft; and
third means for receiving the crank arm when lowered in an anti-rotational manner by displacing the shaft, wherein upon the first means being activated for blocking, it fixes the shaft axially upon the crank arm being lowered into the third means.

14. The electric switch as claimed in claim 13, wherein the first means is adapted to be activated for blocking the drive shaft when the crank arm has been pulled out of the third means.

* * * * *